(No Model.)

F. KOSKUL.
OPEN VENEER ORNAMENTAL WORK.

No. 311,014. Patented Jan. 20, 1885.

Witnesses:
J. P. Theo. Lang
Robt L Fenwick

Inventor:
Frederick Koskul.
by his atty
Fenwick and Lawrence

UNITED STATES PATENT OFFICE.

FREDERICK KOSKUL, OF CHICAGO, ILLINOIS.

OPEN-VENEER ORNAMENTAL WORK.

SPECIFICATION forming part of Letters Patent No. 311,014, dated January 20, 1885.

Application filed May 29, 1884. (No model.)

*To all whom it may concern:*

Be it known that I, FREDERICK KOSKUL, a citizen of the United States, residing at Chicago, in the county of Cook and State of Illinois, have invented a new and useful Improvement in Open-Veneer Ornamental Work, of which the following, with the accompanying drawings, is a specification.

My present invention relates to open-veneer ornamental work, which may be either of wood, metal, celluloid, or any other suitable substance; and it consists in a foundation material covered with cement and open-veneer ornamental work, combined with the same by pressure, the product being an article with a background formed of the same material as that which is applied for cementing the ornamental veneer open-work to the foundation material.

Figure 1:
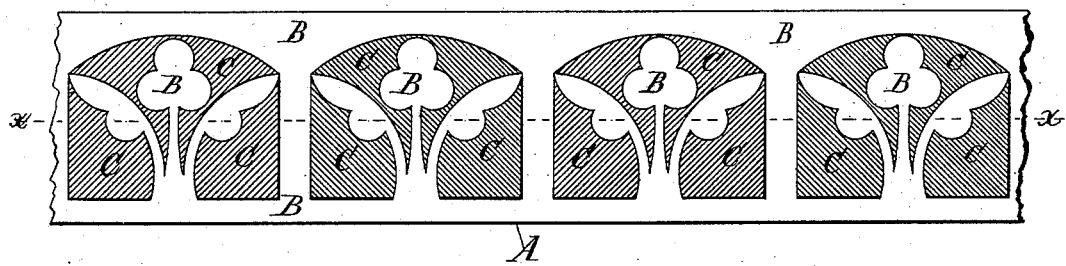
Figure 2:
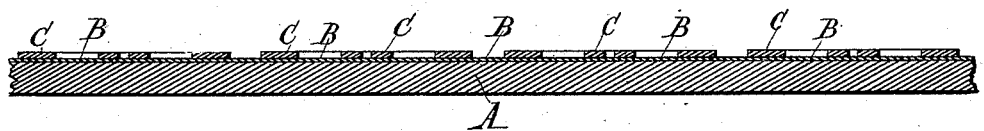

In the accompanying drawings, Figure 1 is a front or face view illustrating one style of open-veneer ornamental work upon a cement background on the foundation material, and Fig. 2 is a sectional view, in the line $x\ x$ of Fig. 1, of the same.

A in the drawings designates the foundation material, B the cementing and background material, and C the open-veneer ornamental work. The ornamental work may be of any desired design, and the foundation material of any approved configuration, while the cement may consist of a paint or of a cementing substance containing drying-oil, or of a cementing substance containing glue, or of a cementing substance containing varnish. By the term "cement" I mean an article possessing the property of adhesion.

In carrying out my invention I shall use either colored cement, or transparent cement, or opaque cement, or semi-opaque cement. If the cement contains varnish, it can be successfully applied by spreading it upon the foundation material, allowing it to become nearly dry, and then applying the ornaments and keeping the whole under pressure until adherence between the ornaments and foundation material through the cement is complete. The same operation is pursued when another suitable cement is used. If glue is a constituent of the cement, the pressure may be employed in connection with a moderate heat; but generally the pressure can be applied without heat.

Gold, silver, or bronze may be mixed with a suitable cement instead of colored pigments, as paint.

The cement may be applied to the foundation either evenly or unevenly, or in such a manner as to present a "dabbled" or rough-sanded appearing surface.

The great benefit of my invention lies in the expedition in which the open-veneer ornamental work can be produced, no trimming out of surplus cementing material after the pressure is applied being required, and the cementing material serves in part for the background, and in part for cementing the ornaments in position upon the foundation, and thus a handsome colored background for the interstices of the ornamental work can be secured with as little labor as is required for cementing the surfaces between the foundation and the ornaments, and a far more finished job accomplished. If glue alone is used to form the background and serve as the cementing agent, all the inconvenience experienced in the use of the same with open-work will be avoided, as the surplus glue usually squeezed out at the edges of the ornaments will become united with that portion which forms the background.

A good cement is formed of boiled linseed-oil alone, or varnish alone, or glue alone, and with either of these pigments or other suitable substances are simply mixed for giving color (either opaque or semi) to the cement.

I do not confine myself to any special cement, but shall employ any and all known suitable cements which can be used advantageously for manufacturing open-veneer ornamental work which has a cement background applied for the purpose and in the manner herein described.

I also would state that this invention differs from my pending application, No. 114,795, wherein varnish cement is specially described for use in carrying out the object sought in said application.

The difference between my present invention and the one just referred to lies in this:

In the pending case heat and pressure combined are employed in the manufacture of varnish-cemented veneer ornamental open-work, whereas with my present invention, by the use of cement which is left in a slightly plastic state, instead of being allowed to dry, the heat may be dispensed with, and the union of the ornaments and foundation material may be effected by continuing the pressure until the cementing agents become fully set.

The object of my present invention is the same as that of my pending application; but the mode of performing it differs therefrom. It will be understood that the ornamental veneer which I employ is of an open character, so that the background formed of the cementing material is visible between the different portions of the figure or ornamental design. Further, that these ornamental veneers are constructed separate from the cementing material, and that the cementing material must be adhesive with respect to the foundation material and to the ornaments which are applied upon the same.

I do not claim the well-known mode of cementing perforated or open ornamental veneers to a foundation material, as heretofore commonly practiced, with glue, not forming a background, as explained in my application filed February 28, 1884.

My invention as herein described comprises a threefold object: first, that of overcoming the difficulty arising from the squeezing out of the glue or cement at the edges of the ornaments; second, that of using the glue or cement in a slightly plastic state; and, third, providing a background of any desired color by means of the glue or other suitable cementing material used, and this by an inexpensive process, which may generally be performed by pressure without the aid of heat.

What I claim as my invention, and desire to secure by Letters Patent, is—

1. Open-veneer ornamental work composed of foundation material, open-veneer ornaments constructed separately from the cementing material, and cement which forms the cementing material for uniting the ornaments and foundation, and the background for the ornamental work, substantially as described.

2. Open-veneer ornamental work composed of the foundation material, and open-veneer ornaments constructed separately from the cementing material and united by and furnished with a cement background, and subjected to pressure while the cement is in a slightly unset or plastic state, substantially as described.

FREDERICK KOSKUL.

Witnesses:
FERDINAND W. C. F. WALTHER,
WILLIAM LOEHDE.